(12) United States Patent
Rallens et al.

(10) Patent No.: US 8,291,171 B2
(45) Date of Patent: Oct. 16, 2012

(54) ALTERING PREFETCH DEPTH BASED ON READY DATA

(75) Inventors: Tyson D. Rallens, Boise, ID (US); Brian S. Bearden, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 12/627,677

(22) Filed: Nov. 30, 2009

(65) Prior Publication Data

US 2011/0131380 A1    Jun. 2, 2011

(51) Int. Cl.
*G06F 12/00* (2006.01)
(52) U.S. Cl. ......................................... 711/137; 711/118
(58) Field of Classification Search ........................ None
See application file for complete search history.

(56) References Cited

U.S. PATENT DOCUMENTS

| | | | |
|---|---|---|---|
| 7,359,890 B1 * | 4/2008 | Ku et al. | 1/1 |
| 7,412,566 B2 * | 8/2008 | Lee et al. | 711/137 |
| 2004/0205298 A1 * | 10/2004 | Bearden et al. | 711/137 |
| 2007/0005903 A1 | 1/2007 | Lau et al. | |
| 2008/0229027 A1 * | 9/2008 | Shioya et al. | 711/137 |
| 2009/0006762 A1 | 1/2009 | Gara et al. | |
| 2009/0019229 A1 | 1/2009 | Morrow et al. | |
| 2009/0055595 A1 | 2/2009 | Gill et al. | |
| 2009/0198907 A1 | 8/2009 | Speight et al. | |

* cited by examiner

*Primary Examiner* — Shawn X Gu

(57) ABSTRACT

A system comprises a controller and a buffer accessible to the controller. The controller is configured to prefetch data from a storage medium in advance of such prefetch data being requested by a host device, some of such prefetch data being retrieved from the storage medium and stored in the buffer ready for access by the host device ("ready data") and a remainder of such prefetch data in process of being retrieved from the storage medium but not yet stored in the buffer ("not ready data"). The controller alters a depth of the prefetch data based on a ratio of the ready data to a combined total of the ready data and not ready data.

17 Claims, 4 Drawing Sheets

ALTERING PREFETCH DEPTH BASED ON READY DATA

BACKGROUND

In storage devices such as disk drives and disk arrays, the primary media on which the data resides is slow compared to the "consumers" or clients of the storage devices, such as servers or personal computers. That is, a computer often is able to request and receive data at a faster rate than a disk drive is able to provide the requested data. The storage subsystem can anticipate a consumer's need for data by prefetching such data, that is, retrieving the data from the storage medium before the consumer has actually requested the data. Prefetching data, however, can be wasteful of system resources. For example, prefetching data into a cache buffer can be wasteful of the capacity of the cache buffer if more data than is needed is prefetched.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a collection of two or more components.

A system may refer to a collection of computers or computer-related devices (e.g., storage device), a subsystem within a computer, etc.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
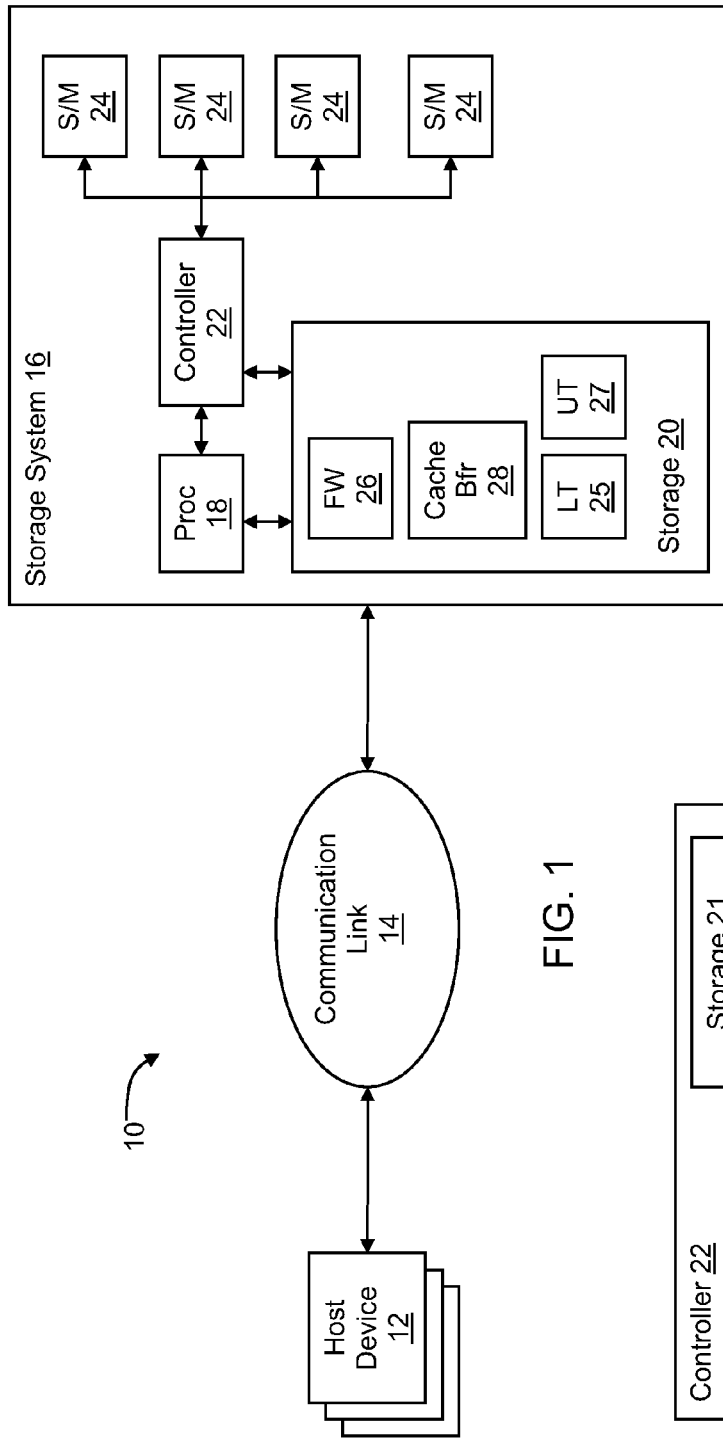
FIG. 1 shows a system in accordance with various embodiments.

FIG. 1 illustrates a system 10 comprising one or more host devices 12 coupled to a storage system 16 via a communication link 14. Each host device 12 comprises a computer (e.g., personal computer, server, etc.) in accordance with some embodiments. In general, each host device 12 is any type of electronic device that has a need to access data stored on the storage system 16. The communication link 14 may comprise a local area network (LAN), wide area network (WAN), wireless and/or wired networks, etc. In some embodiments, the storage system 16 may connect directly to one or more of the host devices 12.

In some embodiments, the storage system 16 is external to a host device 12, while in other embodiments, the storage system 16 is part of the host device. In the embodiment shown in FIG. 1, the storage system 16 comprises a processor 18 coupled to storage 20 and to a controller 22. The controller 22 couples to one or more storage media 24. In accordance with some embodiments, storage 20 comprises volatile storage (e.g., random access memory) while the storage media 24 comprises non-volatile storage such as disk drives, tape drives, and the like. In some embodiments, the storage media 24 are configured as a Redundant Array of Independent Disks (RAID) controlled by controller 22 (functioning as a RAID controller in this configuration). The storage 20 of the storage system 16 comprises firmware 26 executable by processor 18 and/or controller 22, a cache buffer 28, a lower threshold (LT) 25, and an upper threshold (UT) 27.

Figure 2:
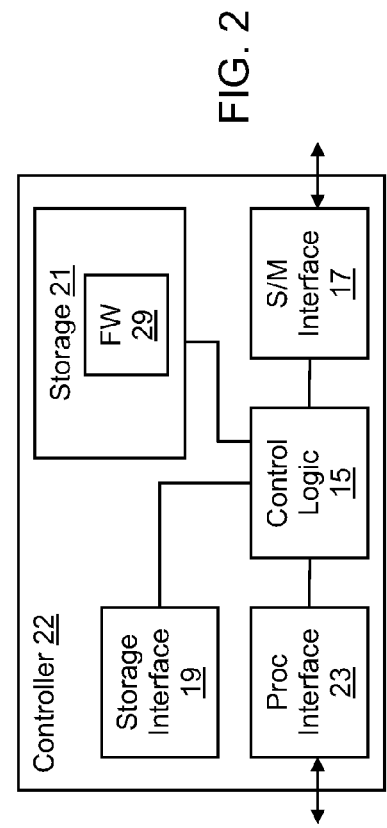
FIG. 2 shows a controller in accordance with various embodiments.

FIG. 2 shows an illustrative embodiment of the controller 22. As shown, the controller 22 comprises control logic 15 coupled to storage interface 19 (interface to storage 20), storage 21 (e.g., volatile or non-volatile storage), a processor interface 23, and a storage media interface 17. The control logic 15 of the example of FIG. 2 comprises a processing core that may execute firmware 29 stored on the storage 21 to provide the controller 22 with the functionality described herein.

Referring again to FIG. 1, in general, a host device 12 issues one or more read or write requests to the storage system 16 for access to data contained on the storage media 24. For read requests, the host device 12 is capable of receiving data from the storage media 24 at a faster rate than the storage media 24 is capable of delivering the requested data. Accordingly, the controller 22 prefetches data from the storage media 24 in advance and in anticipation of the host device 12 submitting a read request to the storage system for such data. Data prefetched by the controller 22 is stored by the controller 22 in the cache buffer 28 implemented in storage 20.

Once the processor 18 of the storage system 16 receives a read request for data from a host device 12, the processor 18 determines whether the requested data is already stored in the cache buffer 28 (i.e., has been prefetched). If the requested data is already stored in the cache buffer 28, the processor 18 retrieves the requested data from the cache buffer and provides the data to the requesting host device 12. If the data is already in the cache buffer 28 when the host 12 requests the data, the read request by the host device is referred to as a "hit."

However, if the requested read data is not in the cache buffer 28 (i.e., has not been prefetched), the processor 18 asserts a signal or a message to the controller 22 to retrieve the requested data from the appropriate storage media 24. Once retrieved from the storage media 24, the data is provided to the requesting host device 12. If the data is not in the cache buffer 28 when the data is requested by the host device 12, the read request by the host device is referred to as a "miss." A host read request resulting in a hit results in a faster reply back to the host with the requested data than for a miss because a hit only requires access to the cache buffer 28 and not, as in the case of a miss, access to the slower storage media 24.

The terms "ready data," "not ready data," and "prefetch depth" will now be explained. When the controller 22 prefetches data, the controller 22 issues a read request to one or more of the storage media 24. It takes a finite amount of time for the requested data to be retrieved from the storage media 24 and stored in the cache buffer 28. The controller 22 may issue a series of read requests to the storage media 24. Eventually, each data retrieved in reply to a specific read request is stored in the cache buffer 28. Consequently, a series of multiple read requests may have been issued to the storage media 24 by the controller 22, but none, some, or all of the requested data may have been actually stored in the cache buffer 28.

Data that has been prefetched and currently resides in the cache buffer 28 awaiting retrieval in response to a host device request is called "ready data." Data that is in the process of being prefetched from the storage media 24 and stored in the cache buffer 28, but is not currently resident in the cache buffer, is called "not ready data." Both of the ready data and the not ready data represent prefetch data. Ready data has been completely prefetched and not ready data is currently being prefetched. The combined amount of ready data and not ready data represents the "prefetch depth." The prefetch depth thus represents the total amount of data the controller 22 is trying to prefetch ahead of read requests from the host 12.

The controller 22 does not necessarily always prefetch data. In accordance with at least some embodiments, the controller 22 detects when a host 12 is reading the storage media 24 in a predictable fashion. In some embodiments, the controller 22 detects when a host 12 is reading through the storage media 24 in a contiguous (sequential) manner. For example, the controller 22 logs the addresses targeted by the read requests from a host. The log may be stored internal to the controller 22 or in storage 20. Upon detecting, for example, a fourth consecutive address in a series of read requests (or other predetermined number of consecutive addresses), the controller 22 determines that the host 12 is reading the storage media 24 contiguously. In some embodiments, the each read by the host 12 comprises a read of a "block" of data. Each block of data comprises one or more bytes of data. For example, a block of data may include 128 megabytes (MB) of data. Thus, the host 12 reads 128 MB of data at a time. The controller 22 determines whether the host 12 is reading contiguous blocks of data.

Once that determination is made, the controller 22 begins prefetching data starting with the next contiguous block of data. In some embodiments, the processor 18 detects when a host device 12 is reading storage media 24 in a contiguous fashion and requests the controller 22 to begin prefetching data. The number of blocks of data to be prefetched ahead of the host's read requests comprises an amount of data to be prefetched and is the prefetch depth explained above. Upon initially beginning to prefetch data, the prefetch depth is set at an initial value. In some embodiments, the initial prefetch depth is set at 3 blocks of data. For the example in which each block includes 128 MB of data, the controller 22 prefetches 3×128 MB or 384 MB of data. The number of blocks to be prefetched generally depends on the size of each block, and both values (size of a block and initial number of blocks to prefetch (initial prefetch depth)) can be varied as desired.

In accordance with various embodiments, any time a change in the prefetch depth is made such as setting the depth at the initial prefetch depth from no prefetching at all (in essence a 0 prefetch depth), the storage system 16 is allowed to stabilize before determining whether to further change the prefetch depth. Otherwise, changes to the prefetch depth may be unstable. Instability may result from deciding to increase the prefetch depth before a prior increase of the depth is actually completed. It takes a finite amount of time to increase the prefetch depth. During that time, the storage system 16 may decide to again increase the prefetch depth because the host device 12 may attempt to read data from the storage media 12 faster than the storage media can supply the requested data.

In accordance with various embodiments, a determination is not made as to whether to further change the size of the prefetch depth until the last entry in the newly increased prefetch depth is requested by the host device 12. In the example of initially starting to prefetch data and initially setting a prefetch depth of 3 blocks, the storage system 16 will not determine whether to further change the prefetch depth until the third block of data in the initial set of three prefetched blocks is requested by the host device 12. If a prefetch depth is increased from 5 blocks to 6 blocks, the storage system 16 will not determine whether to further change the prefetch depth until the sixth block of data in the subsequent set of six prefetched blocks is requested by the host device 12. Ceasing determining whether to further change the prefetch depth advantageously gives the storage system 16 some time to actually have the prefetch depth transition to its new target.

Figure 3:
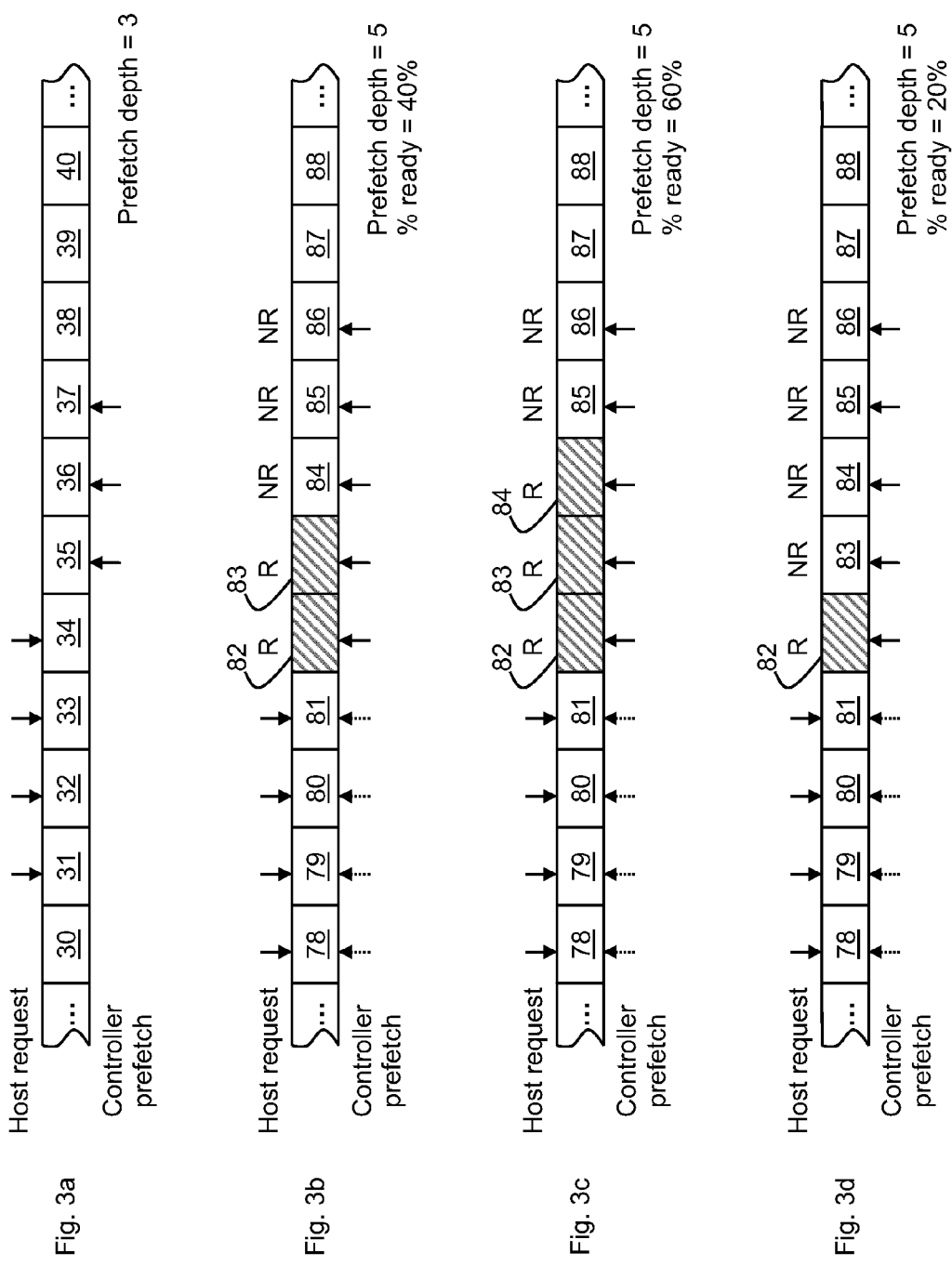
FIGS. 3a-3d illustrate prefetching data in accordance with various embodiments.

FIGS. 3a-3d provide examples of prefetching data and how the controller 22 determines whether to change the size of the prefetch depth in accordance with various embodiments. FIG. 3a illustrates a contiguous set of blocks from storage media 24. The blocks are designated as blocks 30-40. Each block comprises one or more bytes of data (e.g., 128 MB) as desired for a block size. The arrows along the top of the representation represent read requests from a host device 12. Upon the host device 12 issuing a read request for block 34, the controller 22 determines that the host device has issued read requests for four contiguous blocks, blocks 31-34. At that time, the controller 22 determines that the host device 12 is reading through the storage media 24 in a contiguous fashion and begins to prefetch data ahead of the requests from the host device. The arrows along the bottom represent prefetch read requests by controller 22 of a number of blocks ahead of where the host device 12 is currently reading (i.e., block 34). That is, the host device 12 is currently reading block 34 and the controller 22 begins prefetching blocks 35, 36, and 37. In this example, the initial prefetch depth is 3 blocks, but could be different in other embodiments as noted above.

Once the system stabilizes as explained above, the controller 22 determines whether to change the prefetch depth. If the controller 22 experiences a miss (i.e., the host device 12 requests data that has not yet been prefetched and stored in the cache buffer 28 as "ready data"), the controller 22 may automatically increase the prefetch depth. For example, the controller 22 may change the prefetch depth from 3 blocks to 4 blocks. The controller 22 waits for the system to stabilize before again determining whether to further change the prefetch depth. Changes (e.g., increases) to the prefetch depth may occur upon a miss event.

In FIG. 3b, the prefetch depth has increased to a depth of 5 blocks, for example, due to one or cache buffer misses. In this example, the host device 12 has most recently issued a read request for block 81. The controller 22 in the storage system 16 has been prefetching data and had prefetched block 81 previously, as well as blocks 80, 79, and 78 before that (as indicated by the dashed arrows along the bottom of the blocks. Thus, when the host device 12 requests block 81, that particular data is already stored in cache as ready data. The controller 22 in the example of FIG. 3b is prefetching 5 blocks ahead of where the host device 12 is requesting, and thus is prefetching blocks 82-86. As noted above, some data targeted by the prefetching process is already stored in cache buffer 28 and thus is "ready data," while other data is still being prefetched and is not ready data (i.e., not yet stored in cache buffer 28). In FIG. 2, the data of blocks 82 and 83 are ready (R) data (represented visually by cross-hatching for convenience) meaning such data has already been stored in cache buffer 28. The data of blocks 84, 85, and 86 are not ready (NR) data.

As two of the five prefetch blocks in FIG. 3b comprise ready data, the amount of ready data in the example of FIG. 3b represents ⅖, or 40%, of the prefetch depth. Algebraically, the percent ready data is calculated as R/(R+NR). In accordance with various embodiments, once the prefetch depth increases to a predetermined size of N (e.g., N=5 blocks), determining whether to alter the size of the prefetch depth changes from increasing based upon a miss to altering the depth based on a ratio of the ready (R) data to a combined total of ready and not ready (NR) data. Alternatively stated, the prefetch depth is calculated based on a ratio of the ready (R) data to the prefetch depth. The ratio may be computed as a fraction (e.g., ⅖) or as a percentage (e.g., 40%). The percent ready data is indicative of how much data has been prefetched relative to a total amount of data that has been and is being prefetched.

In the example of FIG. 3c, the prefetch depth is still 5 blocks, but the amount of ready (R) data comprises three blocks of data (blocks 82, 83, and 84). The amount of not ready (NR) data is the remaining two blocks 85 and 86 of the prefetch data. Thus, percent ready data is ⅗ (60%).

In the example of FIG. 3d, the prefetch depth is still 5 blocks, but the amount of ready (R) data comprises only one block of data (block 82). The amount of not ready (NR) data is the remaining four blocks 83-86 of the prefetch data. Thus, percent ready data is ⅕ (20%).

The percent ready data is computed by the controller 22 and then compared by the controller 22 to one or more threshold values. In accordance with various embodiments, a lower threshold (LT) and an upper threshold (UT) are provided against which to compare the computed percent ready data. In some embodiments, the lower threshold is 25% (or ¼) and the upper threshold is 50% (or ½). The LT and UT thresholds may be hard-coded into the controller's firmware or stored (and thus programmable) in storage 20 as shown in FIG. 1.

If the percent ready data exceeds the upper threshold (UT), then the controller 22 dynamically and automatically (i.e., without user involvement and during run-time) decreases the prefetch depth. That the percent ready value exceeds the upper threshold indicates that more data than necessary is being prefetched thereby possibly wasting system resources. Reducing the size of the prefetch depth will likely still provide an adequate prefetch depth but require fewer system resources (e.g., less cache buffer storage, less use of the controller 22, etc.). In the example of FIG. 3c, the percent ready is 60% which exceeds an illustrative upper threshold of 50%. As such, for the example of FIG. 3c, the controller 22 would respond by reducing the prefetch depth from 5 blocks to a value less than 5 (e.g., 4).

If the percent ready data falls below the lower threshold (LT), then the controller 22 dynamically and automatically (i.e., without user involvement and during run-time) increases the prefetch depth. That the percent ready value drops below the lower threshold indicates that a miss condition may soon result in which the host device 12 requests data that is not already prefetched and in the cache buffer 28. Increasing the size of the prefetch depth should reduce the risk of encountering a miss, and thus reduce the risk of the latency associated with a cache miss. In the example of FIG. 3d, the percent ready is 20% which is below an illustrative lower threshold of 25%. As such, for the example of FIG. 2d, the controller 22 would respond by increasing the prefetch depth from 5 blocks to a value greater than 5 (e.g., 6).

In accordance with various embodiments, each time the storage system 16 (and in particular the controller 22) receives a read request from a host device 12 for which the controller 22 is prefetching data, the controller 22 computes the percent ready data and determines whether the prefetch depth should be increased or decreased. Changing (either increasing or decreasing) the prefetch depth may be performed in one block increments or multiples of one block increments. Further, the prefetch process is allowed to stabilize as explained above before the controller 22 again reassesses whether to alter the prefetch depth.

Figure 4:
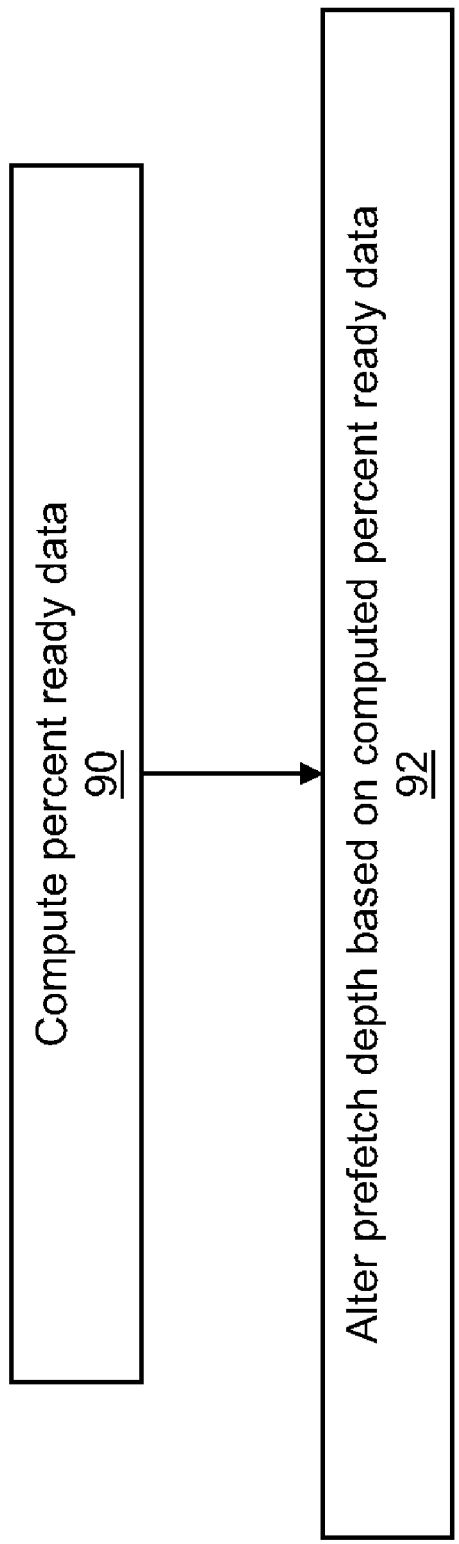
FIG. 4 shows a method in accordance with various embodiments.

FIG. 4 shows a method in accordance with various embodiments. At 90, the controller 22 computes the percent ready data which is indicative of how much data has been prefetched relative to a total amount of data that has been and is being prefetched. At 92, the controller alters the prefetch depth based on the computed percent ready data.

Figure 5:
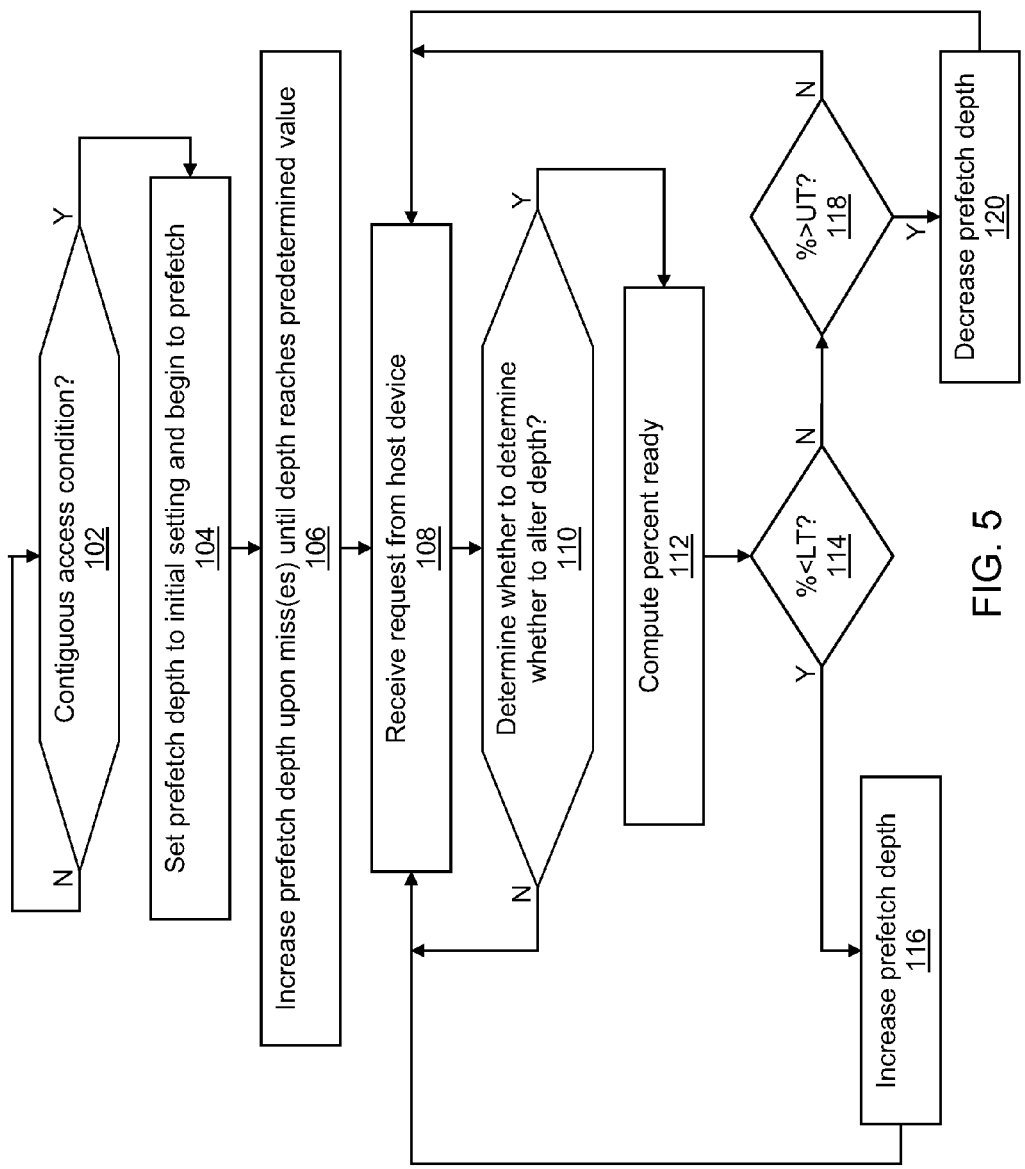
FIG. 5 shows another method in accordance with various embodiments.

FIG. 5 shows another method in accordance with various embodiments. The actions depicted in FIG. 5 are performed by the controller 22 of the storage system 16. The actions can be performed in the order shown or in a different order. Further, some of the actions can be performed at the same time (i.e., in parallel).

At block 102, the method comprises the controller 22 detecting a contiguous access condition by a host device 12. As explained above, this action can be performed by the controller detecting that a host device has attempted to read the Nth (e.g., 4$^{th}$) block in a row in a contiguous fashion. The method continues to monitor for this condition until the controller 22 detects that the contiguous access condition has occurred. At that point, the controller 22 begins prefetching data from storage media 24 on behalf of the host device 12, and in anticipation of the host device 12 requesting such data. At 104, the controller 22 sets the initial prefetch depth and begins to prefetch the data.

At 106, the controller 22 may detect a miss and as a result of the miss, increase the prefetch depth. The controller may continue to increase the prefetch depth upon detecting misses until a predetermined prefetch depth size is reached. At that point, the controller 22 changes from basing prefetch depth changes on misses to basing prefetch depth changes on a computation of the percent ready data. Actions 108-120 depict that part of the method of FIG. 4 devoted to basing prefetch depth changes on a computation of the percent ready data.

At 108, the controller 22 receives a request (e.g., a read request) from a host device 12. At 110, the controller determines whether to alter the prefetch depth based on a computation of the percent ready data. That is, if the prefetch depth has recently been altered but has not stabilized, the controller 22 may skip the subsequent actions of computing the percent ready data and using that value to determine whether the prefetch depth should be altered.

At 112, the controller computes the percent ready data and at 114 compares the percent ready data to the lower threshold. If the computed percent ready data is less than the lower threshold, then at 116, the controller 22 increases the size of the prefetch depth and control loops back to action 108 in which another host device request is received. If the percent ready data is not below the lower threshold, then at 118 the controller 22 determines whether the percent ready data exceeds the upper threshold. If the percent ready is greater than the upper threshold, then at 120, the controller 22 decreases the prefetch depth. If, at 118, the percent ready is not greater than the upper threshold (i.e., the percent ready data is between the lower and upper thresholds), then control simply loops back to action 108 waiting for another request from the host device.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a controller;
   a buffer accessible to said controller;
   wherein said controller is configured to prefetch data from a storage medium in advance of such prefetch data being requested by a host device, some of such prefetch data being retrieved from said storage medium and stored in said buffer ready for access by the host device ("ready data") and a remainder of such prefetch data in process of being retrieved from said storage medium but not yet stored in said buffer ("not ready data");
   wherein said controller alters a depth of the prefetch data based on a ratio of the ready data to a combined total of said ready data and not ready data.

2. The system of claim 1 wherein said controller increases said depth if the ratio falls below a first threshold.

3. The system of claim 1 wherein said controller decreases said depth if the ratio rises above a second threshold.

4. The system of claim 1 wherein said controller computes said ratio upon receiving a request from the host device for data from said storage medium.

5. The system of claim 4 wherein, upon altering said depth, said controller temporarily stops further altering said depth of the prefetch data until a predetermined amount of prefetch data has been read by the host device.

6. The system of claim 1 wherein said controller alters the depth of the prefetch data based on a buffer miss until the depth reaches a predetermined size after which the controller alters the depth based on said ratio.

7. A controller, comprising:
   a storage media interface;
   control logic coupled to said storage media interface, wherein said control logic is configured to prefetch data via said storage media interface in advance of such prefetch data being requested by a host device;
   wherein said control logic is configured to alter a depth of the prefetch data in accordance with an amount of prefetch data that has been stored in a buffer relative to an amount of prefetch data that has not yet been stored in the buffer.

8. The controller of claim 7 wherein said control logic is configured to increase said depth if the amount of the prefetch data that has been stored in the buffer relative to the amount of prefetch data that has not been stored in the buffer falls below a first threshold.

9. The controller of claim 7 wherein said control logic is configured to decrease said depth if the amount of the prefetch data that has been stored in the buffer relative to the amount of prefetch data that has not been stored in the buffer rises above a second threshold.

10. The controller of claim 7 wherein said control logic is configured to compute a ratio using said amounts upon receiving a request from the host device for data from a storage medium.

11. The controller of claim 10 wherein said control logic is configured to alter the depth based on said ratio.

12. The controller of claim 11 wherein said control logic is configured to increase said depth when the ratio falls below a lower threshold and to decrease said depth when the ratio exceeds an upper threshold.

13. A method, comprising:
    computing, by a controller, percent ready data, wherein said percent ready data is indicative of how much data has been prefetched relative to a total amount of data that has been and is being prefetched;
    altering, by the controller, a prefetch depth based on the computed percent ready data.

14. The method of claim 13 further comprising comparing the percent ready data to a threshold.

15. The method of claim 14 wherein altering the prefetch depth comprises decreasing the prefetch depth if the percent ready is greater than the threshold.

16. The method of claim 14 wherein altering the prefetch depth comprises increasing the prefetch depth if the percent ready is less than the threshold.

17. The method of claim 13 further comprising comparing the percent ready data to a lower threshold and increasing the prefetch depth if the percent ready data is lower than the lower threshold, and comparing the percent ready data to an upper threshold and decreasing the prefetch depth if the percent ready is greater than the upper threshold.

* * * * *